Aug. 14, 1951  G. M. HOLLEY, JR  2,564,108
REMOTE CONTROL DEVICE
Filed Nov. 18, 1946  2 Sheets-Sheet 1

INVENTOR.
GEORGE M. HOLLEY, JR.
BY
ATTORNEY

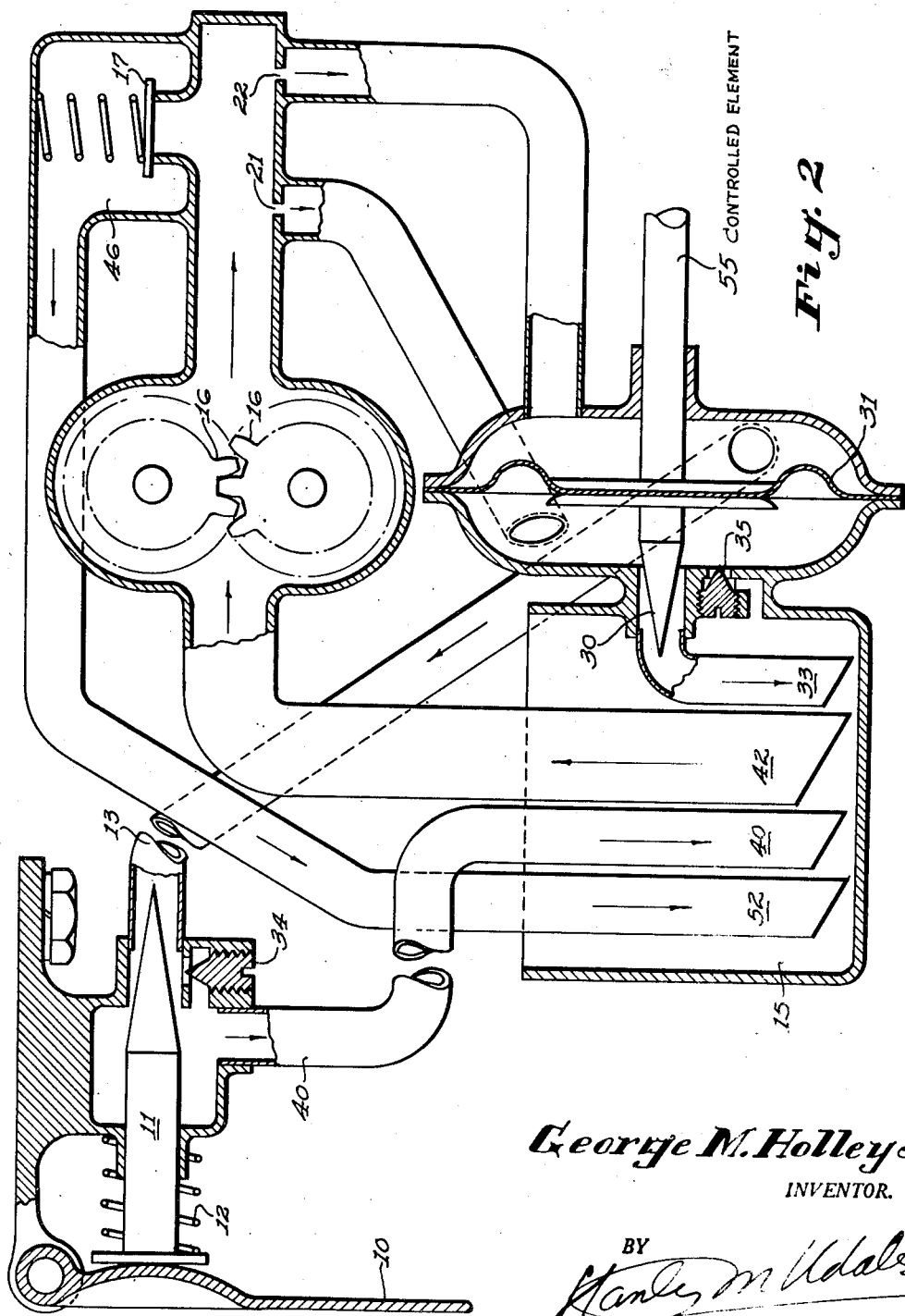

Patented Aug. 14, 1951

2,564,108

UNITED STATES PATENT OFFICE 2,564,108

REMOTE CONTROL DEVICE

George M. Holley, Jr., Grosse Pointe, Mich., assignor to George M. Holley and Earl Holley Application November 18, 1946, Serial No. 710,559

2 Claims. (Cl. 60—52)

This invention relates to a fluid pressure, remote control system.

The object of this invention is to arrange for a manually controlled valve to control hydraulically an element some distance away whereby the movement of the valve is followed almost instantaneously by the movement of the element to be controlled.

Fig. 2 shows the simplified form of my invention.

Figure 1:
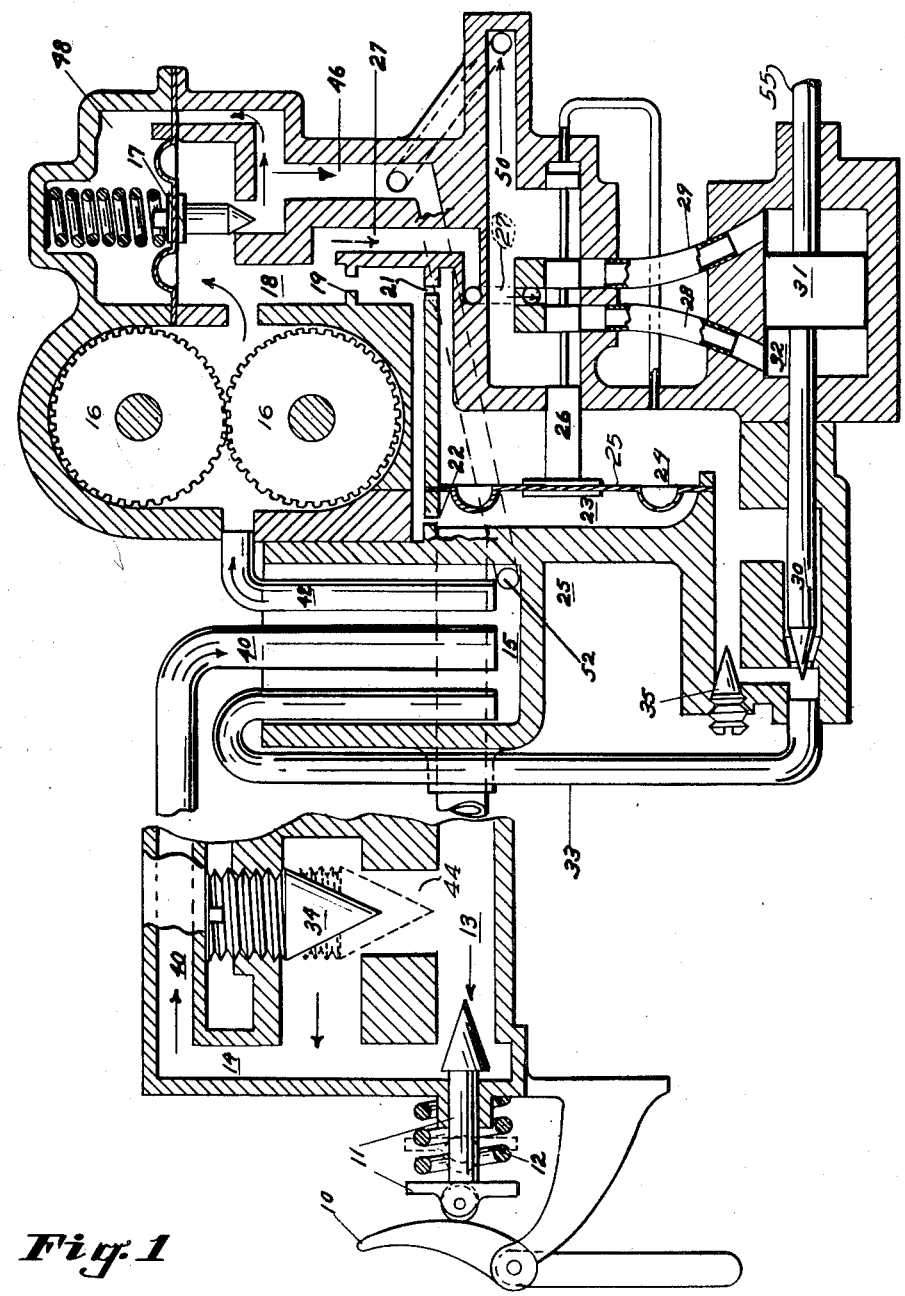
Fig. 1 shows diagrammatically the preferred form of my invention.

In Fig. 1, 10 is the manually operated element including a cam, 11 is a valve and a valve head engaging with the cam, 12 is a spring causing the head of the valve to engage with the cam, 13 is an oil passage under pressure discharging oil past the valve to a passage 14, which discharges into a reservoir 15 through the passage 40, 16 is a fluid pump supplied with fluid from the reservoir 15 through a passage 42 and having a constant pressure relief valve 17, so that the oil in the outlet passage 18 is at a constant pressure. A restriction 19 delivers the oil under pressure to a manifold, which is provided with two identical restrictions 21 and 22. The restriction 22 delivers oil to the passage 13 and to the chamber 23, located to the left of the diaphragm 25, and the chamber 24, to the right of diaphragm 25, is connected through the restriction 21. Chambers 23 and 24 are thus separated by the diaphragm 25. The servomotor valve 26 is moved by the diaphragm 25 and is supplied with oil under pressure from passage 27 communicating with the chamber 18. When the diaphragm 25 moves to the right, servomotor valve 26 moves to the right, the passage 27 is put into communication with passage 29; when the diaphragm 25 moves to the left, passage 27 communicates with the passage 28. Valve 30 is connected to a piston 31 in the cylinder 32. The valve 30 controls the connection from the chamber 24 back through the passage 33 to the reservoir 15. Valve 34 and 35 each provide an adjustable bypass, the valve 34 regulates the leak around the valve 11 and the valve 35 regulates the leak around the valve 30.

The low-pressure oil escapes from the cylinder 32 through the passage 28 when the valve 26 is moved to the right and the piston 31 is thereupon pushed to the left by means of the pressure transmitted through the pipe 29 to the right hand end of the cylinder 32. The low pressure oil escapes through the passage 50 to the reservoir 15.

A chamber 48, above the valve 17, contains a spring which loads the valve 17. The fuel escaping past the valve 17 flows down the passage 46, through the passage 52, into the reservoir 15. The pressure downstream from the valve 17 is communicated with the chamber 48 above the valve 17.

In Fig. 2 the servomotor valve 26 has been eliminated and the number 55 has been applied to the controlled element. The other parts are numbered as in Fig. 1 and have the same function.

Operation

When the valve 11 moves to the left under the influence of spring 12, the valve 11 opens and the pressure in the chambers 13 and 23 falls. When cam 10 is rotated anti-clockwise the servomotor valve 26 is moved to the left. Oil under pressure in pipe 27 flows down pipe 28 and piston 31 is pushed to the right. Valve 30 moves to the right, pressure in chamber 24 falls to equal the pressure in chamber 23, and the servomotor valve 26 is restored to the position of normal equilibrium, that is, the neutral position in which it is shown.

Hence, the piston 31 may be located at a considerable distance away from the cam 10. Moreover the force exerted by the piston 31 is determined by the pressure of the pump 16 and the area of the piston 31. Hence, a small force at the face of the cam 10 becomes a greater force on the piston 31.

With my invention there is one, and only one, position for the valve 30 and the piston rod 55 connected to piston 31, which is the controlled element, for each position of the manually operated element 10 and valve 11.

The piston 31 and its rod 55 which is the controlled element, follows exactly and promptly every change in the position of the controlling element 10 and valve 11.

Fig. 2 operates in the same manner as Fig. 1 except that the pressure is applied direct to the moving wall 31 without the intervention of a servomotor valve.

What I claim is:

1. A remote control device comprising a source of fluid under pressure, a servomotor valve, a first moving wall connected to said valve, a second moving wall controlled by said valve, a chamber on each side of said second moving wall, the application of said fluid under pressure to either one side or the other of said second moving wall being selected by said servomotor valve, a third chamber located on one side of said first moving wall, a restricted passage from the source of fluid pressure to said third chamber, a fourth chamber which acts as a low pressure receiving chamber, a manually and positively controlled valve for controlling the flow of fluid out of said third chamber into said fourth chamber, a fifth chamber located on the other side of said first moving wall, a restricted passage from the source of fluid pressure to said fifth chamber, an automatically controlled valve positively connected to said second moving wall for controlling the flow of fluid out of said fifth chamber into said fourth chamber whereby the motion of the manually controlled valve controls the motion of the automatically controlled valve through said servomotor valve.

2. A remote controlled device of the hydraulic type having manually and positively operated means comprising an overflow chamber for the hydraulic liquid, a pump for said liquid, driving means for said pump, a first return passage from said pump to said chamber, an operating valve remote from the controlled element, said valve being manually and positively controlled and located so as to control the return of the liquid from said pump to said chamber through said first return passage, a moving wall connected to said controlled element, means responsive to the liquid pressure upstream of said operating valve to move said moving wall and said controlled element in one direction, a second return passage, a second valve therein positively connected to said controlled element and designed so as to close as the controlled element moves in said direction and thus raise the pressure upstream of said second valve, the pressure upstream of said second valve being applied to said moving wall so as to open said second valve and to move the controlled element in the opposite direction to the movement responsive to the pressure upstream of said manually operated valve.

GEORGE M. HOLLEY, JR.

REFERENCES CITED

The following references are of record in the file of this patent:

UNITED STATES PATENTS

| Number | Name | Date |
| --- | --- | --- |
| 826,979 | Wilkinson | July 24, 1906 |
| 1,904,112 | Achard | Apr. 16, 1933 |
| 2,177,098 | Doe et al. | Oct. 24, 1939 |
| 2,191,792 | Hill | Feb. 27, 1940 |

FOREIGN PATENTS

| Number | Country | Date |
| --- | --- | --- |
| 423,676 | Germany | Jan. 1, 1926 |